(12) United States Patent
Gonzalez

(10) Patent No.: US 6,883,945 B1
(45) Date of Patent: Apr. 26, 2005

(54) HITCH LIGHT SYSTEM

(76) Inventor: Kelvin Gonzalez, 12209 SW. 14th La., Miami, FL (US) 33184

( * ) Notice: Subject to any disclaimer, the term of this patent is extended or adjusted under 35 U.S.C. 154(b) by 0 days.

(21) Appl. No.: 10/719,338

(22) Filed: Nov. 21, 2003

(51) Int. Cl.[7] .......................................... F21W 101/14
(52) U.S. Cl. ..................................... 362/485; 362/545
(58) Field of Search ................................ 362/540–546, 362/485, 505, 506

(56) References Cited

U.S. PATENT DOCUMENTS

| | | | | |
|---|---|---|---|---|
| 4,800,471 | A * | 1/1989 | Lippert | 362/485 |
| 6,053,627 | A * | 4/2000 | Vo et al. | 362/485 |
| 6,097,283 | A * | 8/2000 | Szudarek et al. | 340/431 |
| 6,357,899 | B1 * | 3/2002 | Craven | 362/485 |
| 6,379,028 | B1 * | 4/2002 | Crouse et al. | 362/485 |
| 6,655,822 | B1 * | 12/2003 | Sylvester | 362/485 |
| 6,734,792 | B1 * | 5/2004 | McElveen | 340/468 |
| 6,783,266 | B2 * | 8/2004 | McCoy et al. | 362/485 |

* cited by examiner

*Primary Examiner*—Laura K. Tso
(74) *Attorney, Agent, or Firm*—Edward P. Dutkiewicz

(57) ABSTRACT

A hitch assembly coupled to the rear of a motor vehicle has a female tube with a bore. A backing plate has a forward face and a rearward face. The forward face has a male with a horizontal bore. A housing plate has a front side, a rear side and a plurality of patterned holes. Each hole is adapted to receive an element with a light emitting end and a power receiving end. A lens cover has a closed rear portion and an open forward portion adapted to enclose the system.

4 Claims, 3 Drawing Sheets

HITCH LIGHT SYSTEM

BACKGROUND OF THE INVENTION

1. Field of the Invention

The present invention relates to a hitch light system and more particularly pertains to displaying illuminated messages and designs to enhance a motor vehicle's rear lights and turn signals.

2. Description of the Prior Art

The use of vehicle display accessories of known designs and configurations is known in the prior art. More specifically, vehicle display accessories of known designs and configurations previously devised and utilized for the purpose of providing displays on vehicles through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,291,906 relates to a information display for vehicles issued Sep. 18, 2001 to Marcus et al. U.S. Pat. No. 6,178,677 relates to a vehicle-mounted, rear-directed message display apparatus issued Jan. 30, 2001 to Williams. Lastly, U.S. Pat. No. 6,150,996 relates to a changeable message sign system with reconfigurable sign screen issued Nov. 21, 2000 to Nicholson.

While these devices fulfill their respective, particular objectives and requirements, the aforementioned patents do not describe hitch light system that allows displaying illuminated messages and designs to enhance a motor vehicle's rear lights and turn signals.

In this respect, the hitch light system according to the present invention substantially departs from the conventional concepts and designs of the prior art, and in doing so provides an apparatus primarily developed for the purpose of displaying illuminated messages and designs to enhance a motor vehicle's rear lights and turn signals.

Therefore, it can be appreciated that there exists a continuing need for a new and improved hitch light system which can be used for displaying illuminated messages and designs to enhance a motor vehicle's rear lights and turn signals. In this regard, the present invention substantially fulfills this need.

SUMMARY OF THE INVENTION

In view of the foregoing disadvantages inherent in the known types of vehicle display accessories of known designs and configurations now present in the prior art, the present invention provides an improved hitch light system. As such, the general purpose of the present invention, which will be described subsequently in greater detail, is to provide a new and improved hitch light system and method which has all the advantages of the prior art and none of the disadvantages.

To attain this, the present invention essentially comprises a hitch assembly. The hitch assembly is coupled to the rear of a motor vehicle. The hitch assembly has a horizontally extended female tube. The female tube has a rectangular interior. A horizontal bore passes laterally through the tube. The assembly also has a female electrical connector. The female electrical connector provides power and signals from an associated motor vehicle with regards to messages, turning and braking.

A backing plate is provided. The backing plate is fabricated of a reinforced material. The reinforced material is from the class of reinforced materials. The class of reinforced materials includes but is not limited to plastic, fiberglass and metal. The backing plate provides support to the system. The backing plate has a generally rectangular configuration. The backing plate has a recessed upper portion, a beveled periphery, a forward face and a rearward face. The forward face has a horizontally extended male tube. The male tube has a rectangular exterior. The male tube is adapted to be removably received in the female tube of the hitch assembly. A horizontal bore passes transversely through the male tube. The bore is adapted to align with the horizontal bore of the female tube when the hitch assembly and backing plate are releasably coupled. The backing plate further has a male electrical connector. The male electrical connector is adapted to couple with the female electrical connector of the hitch assembly. In this manner the power and signals may be received from an associated motor vehicle.

Provided next is a locking pin. The locking pin is in a cylindrical configuration. The locking pin is adapted to pass through the aligned horizontal bores of the female tube and bores of the male tube. In this manner a secure connection may be provided between the female and male tubes.

Further provided is an LED housing plate. The LED housing plate is fabricated of an aluminum board. The LED housing plate has a recessed upper portion, a front side, a rear side. A plurality of patterned holes is provided through the LED housing plate. Each hole is adapted to receive an LED. Each LED has an exterior light emitting end and an interior power receiving end. Each LED is coupled to the LED housing plate. In this manner the light emitting end of the LED is adjacent the rear side. The power receiving end is adjacent to the front side. The LEDs are of various colors and designs as designated by the utility of the user. The LEDs are adapted to be electrically coupled to a chip. The chip is further connected to the male electrical connecter of the backing plate. In this manner the chip is adapted to control the sequence of flashing and patterns of the LEDs.

Provided last is a plastic lens cover. The plastic lens cover is in a generally rectangular configuration. The plastic lens cover has a recessed upper portion, a closed rear portion and an open forward portion. A forward extending edge is provided. The forward extending edge is adapted to enclose the system by covering the LED housing plate. The rear side of the LED housing plate is adjacent to the closed rear portion of the plastic lens cover. The forward extending edge of the open forward portion rests within the beveled periphery of the backing plate. A plurality of screws holding the lens in place.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hitch light system which has all of the advantages of the prior art vehicle display accessories of known designs and configurations and none of the disadvantages.

It is another object of the present invention to provide a new and improved hitch light system which may be easily and efficiently manufactured and marketed.

It is further object of the present invention to provide a new and improved hitch light system which is of durable and reliable constructions.

An even further object of the present invention is to provide a new and improved hitch light system which is susceptible of a low cost of manufacture with regard to both materials and labor, and which accordingly is then susceptible of low prices of sale to the consuming public, thereby making such hitch light system economically available to the buying public.

Even still another object of the present invention is to provide a hitch light system for displaying illuminated messages and designs to enhance a motor vehicle's rear lights and turn signals.

Lastly, it is an object of the present invention to provide a new and improved hitch light system. A hitch assembly coupled to the rear of a motor vehicle has a female tube with a bore. A backing plate has a forward face and a rearward face. The forward face has a male with a horizontal bore. A housing plate has a front side, a rear side and a plurality of patterned holes. Each hole is adapted to receive an element with a light emitting end and a power receiving end. A lens cover has a closed rear portion and an open forward portion adapted to enclose the system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
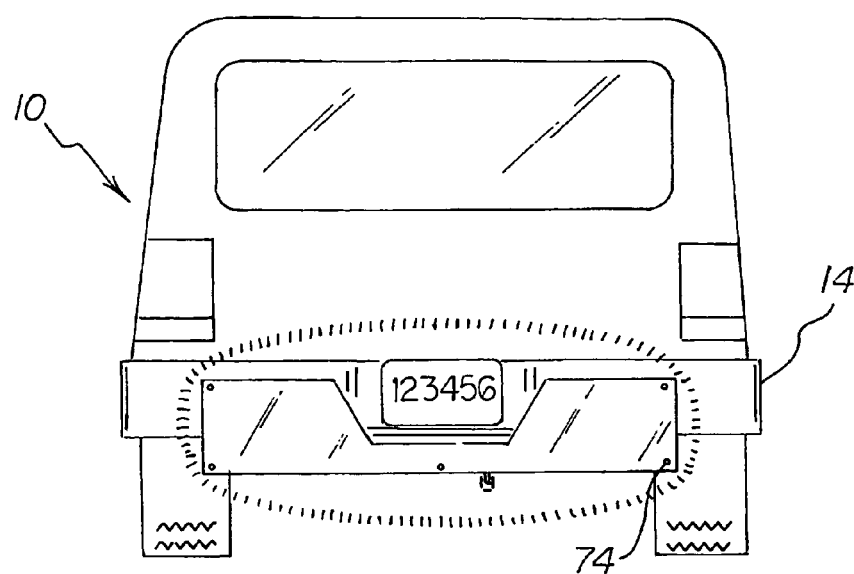
FIG. 1 is a perspective illustrations of a hitch light system constructed in accordance with the preferred embodiment of the present invention.
Figure 2:
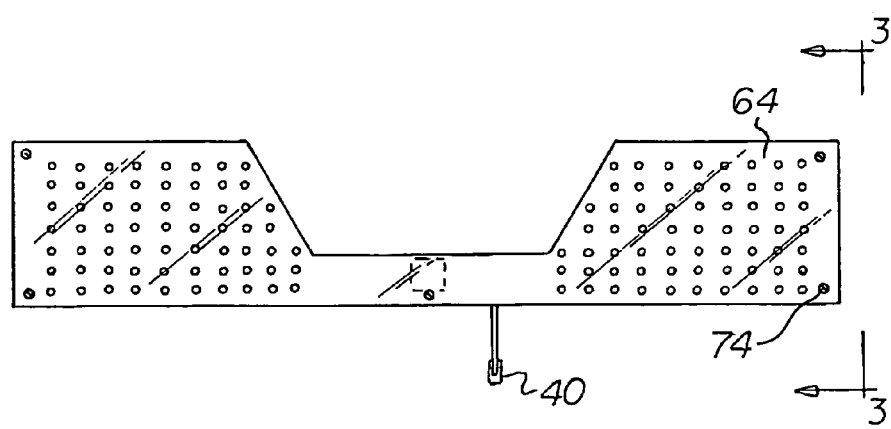
FIG. 2 is an enlarged end elevational view of the system shown in FIG. 1.
Figure 3:
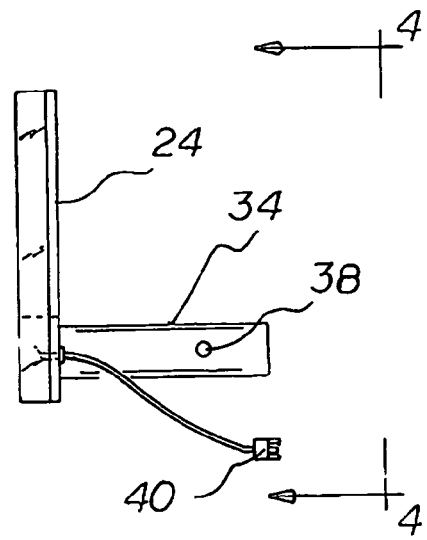
FIG. 3 is a side elevational view of the system taken along line 3—3 of FIG. 2.
Figure 4:
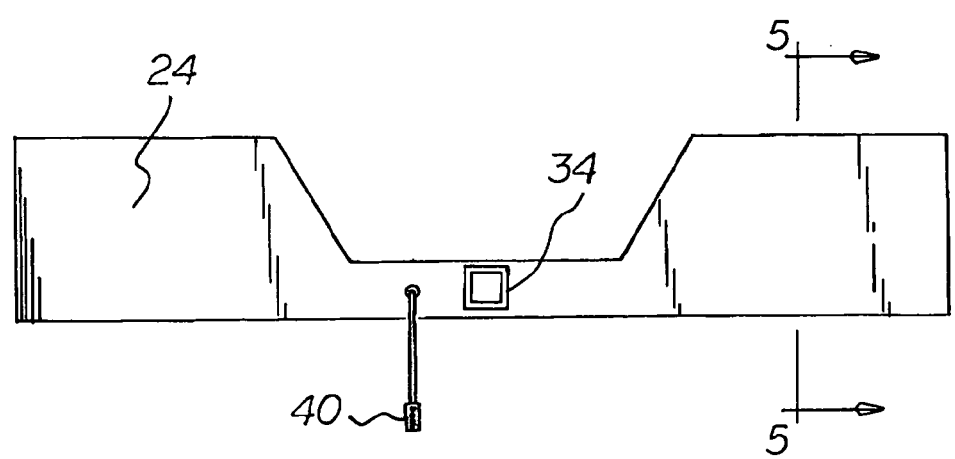
FIG. 4 is a rear elevational view of the system taken along line 4—4 of FIG. 3.
Figure 5:
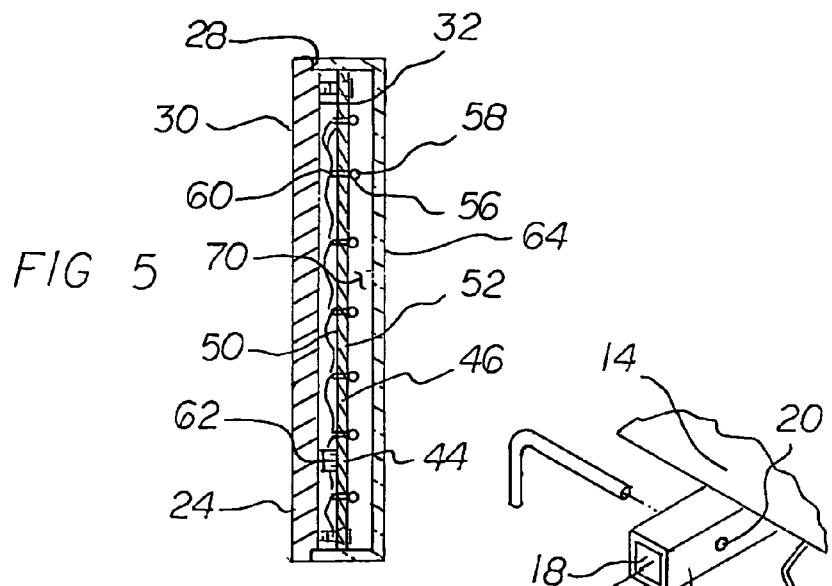
FIG. 5 is a cross section view of the system taken along line 5—5 of FIG. 4.
Figure 6:
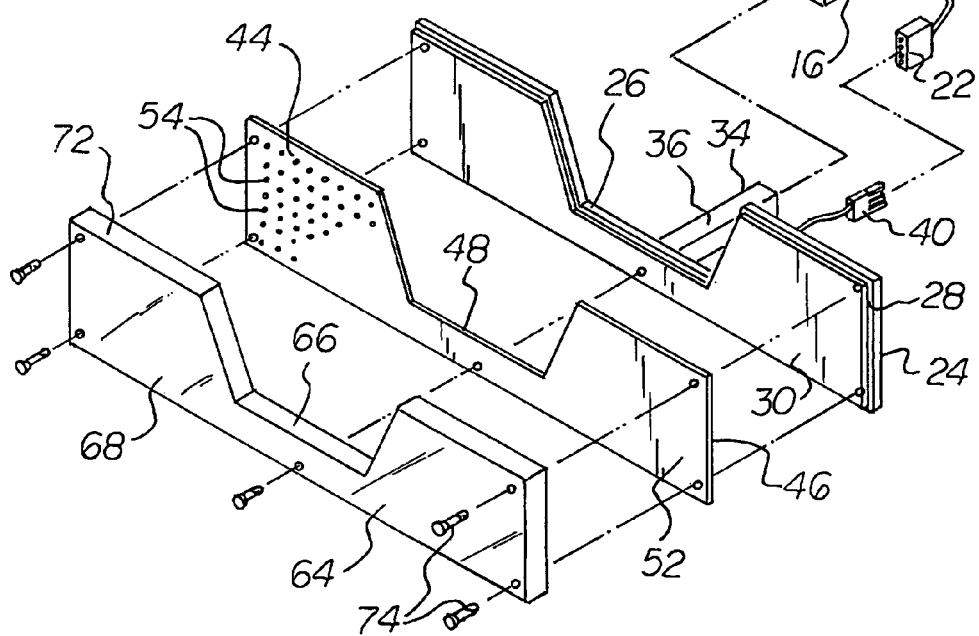
FIG. 6 is an exploded perspective illustration of the system shown in the prior Figures.

With reference now to the drawings, and in particular to FIG. 1 thereof, the preferred embodiment of the new and improved hitch light system embodying the principles and concepts of the present invention and generally designated by the reference numeral 10 will be described.

The present invention, the hitch light system 10 is comprised of a plurality of components. Such components in their broadest context include a hitch assembly, a backing plate, a housing plate, and a lens plate. Such components are individually configured and correlated with respect to each other so as to attain the desired objective.

First provided is a hitch assembly 12. The hitch assembly is coupled to the rear of a motor vehicle 14. The hitch assembly has a horizontally extended female tube 16. The female tube has a rectangular interior 18. A horizontal bore 20 passes laterally through the tube. The assembly also has a female electrical connector 22. The female electrical connector provides power and signals from an associated motor vehicle with regards to messages, turning and braking.

A backing plate 24 is provided. The backing plate is fabricated of a reinforced material. The reinforced material is from the class of reinforced materials. The class of reinforced materials includes but is not limited to plastic, fiberglass and metal. The backing plate provides support to the system. The backing plate has a generally rectangular configuration. The backing plate has a recessed upper portion 26, a beveled periphery 28, a forward face 30 and a rearward face 32. The forward face has a horizontally extended male tube 34. The male tube has a rectangular exterior 36. The male tube is adapted to be removably received in the female tube of the hitch assembly. A horizontal bore 38 passes transversely through the male tube. The bore is adapted to align with the horizontal bore of the female tube when the hitch assembly and backing plate are releasably coupled. The backing plate further has a male electrical connector 40. The male electrical connector is adapted to couple with the female electrical connector of the hitch assembly. In this manner the power and signals may be received from an associated motor vehicle.

Provided next is a locking pin 42. The locking pin is in a cylindrical configuration. The locking pin is adapted to pass through the aligned horizontal bores of the female tube and bores of the male tube. In this manner a secure connection may be provided between the female and male tubes.

Further provided is an LED housing plate 44. The LED housing plate is fabricated of a rigid board 46, preferably aluminum. The LED housing plate has a recessed upper portion 48, a front side 50, a rear side 52. A plurality of patterned holes 54 is provided through the LED housing plate. Each hole is adapted to receive a light emitting element 56 such as, preferably, a light emitting diode (LED) or other equivalent element such as an incandescent bulb or the like. Each LED has an exterior light emitting end 58 and an interior power receiving end 60. Each LED is coupled to the LED housing plate. In this manner the light emitting end of the LED is adjacent the rear side. The power receiving end is adjacent to the front side. The LEDs are of various colors and designs as designated by the utility of the user. The LEDs are adapted to be electrically coupled to a chip 62. The chip is further connected to the male electrical connecter of the backing plate. In this manner the chip is adapted to control the sequence of flashing and patterns of the LEDs.

Provided last is a plastic lens 64 cover. The plastic lens cover is in a generally rectangular configuration. The plastic lens cover has a recessed upper portion 66, a closed rear portion 68 and an open forward portion 70. A forward extending edge 72 is provided. The forward extending edge is adapted to enclose the system by covering the LED housing plate. The rear side of the LED housing plate is adjacent to the closed rear portion of the plastic lens cover. The forward extending edge of the open forward portion rests within the beveled periphery of the backing plate. A plurality of screws 74 hold the lens in place. The lens is preferably transparent. In an alternate embodiment the lens is translucent.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hitch light system for displaying illuminated messages and designs to enhance a motor vehicle's rear lights and turn signals comprising, in combination:

a hitch assembly coupled to the rear of a motor vehicle with a horizontally extended female tube having a rectangular interior, the tube having a horizontal bore passing laterally there through, the assembly also having a female electrical connector to provide power and signals from an associated motor vehicle with regards to messages, turning and braking;

a backing plate fabricated of a reinforced material from the class of reinforced materials including but not limited to plastic, fiberglass and metal to provide support to the system and having a generally rectangular configuration with a recessed upper portion, a beveled periphery, a forward face and a rearward face, the forward face having a horizontally extended male tube with a rectangular exterior adapted to be removably received in the female tube of the hitch assembly, the male tube further having a horizontal bore passing transversely there through and being adapted to align with the horizontal bore of the female tube when the hitch assembly and backing plate are releasably coupled, the backing plate further having a male electrical connector being adapted to couple with the female electrical connector of the hitch assembly to thereby receive power and signals from an associated motor vehicle;

a locking pin of a cylindrical configuration adapted to pass through the aligned horizontal bores of the female tube and bores of the male tube to thereby provide a secure connection there between;

an LED housing plate fabricated of an aluminum board and having a recessed upper portion, a front side, a rear side and a plurality of patterned holes there through, each hole being adapted to receive an LED, each LED having an exterior light emitting end and an interior power receiving end, each LED being coupled to the LED housing plate such that the light emitting end of the LED is adjacent the rear side and the power receiving end is adjacent to the front side, the LEDs being of various colors and designs as designated by the utility of the user, the LEDs adapted to be electrically coupled to a chip which is further connected to the male electrical connecter of the backing plate and thereby adapted to control the sequence of flashing and patterns of the LEDs; and a plastic lens cover of a generally rectangular configuration having a recessed upper portion, a closed rear portion and an open forward portion with a forward extending edge and being adapted to enclose the system by covering the LED housing plate with the rear side of the LED housing plate being adjacent to the closed rear portion of the plastic lens cover and having the forward extending edge of the open forward portion resting within the beveled periphery of the backing plate and a plurality of screws holding the lens in place.

2. A hitch light system comprising:

a hitch assembly couplable to the rear of a motor vehicle with a female tube having a bore passing there through;

a backing plate having a forward face and a rearward face with the forward face having a male tube, the male tube further having a horizontal bore passing there through;

a housing plate being having a front side, a rear side and a plurality of patterned holes there through, each hole being adapted to receive an element having a light emitting end and a power receiving end; and a lens cover having a closed rear portion and an open forward portion adapted to enclose the system.

3. The system as set forth in claim 2 wherein the elements are LED's.

4. The system as set forth in claim 2 and further including a locking pin to removably couple the hitch assembly and the backing plate.

\* \* \* \* \*